UNITED STATES PATENT OFFICE 2,374,173

HYDROXYTETRAHYDRONORPOLYCYCLO-PENTADIENES

Herman A. Bruson, Philadelphia, Pa., assignor to The Resinous Products & Chemical Company, Philadelphia, Pa., a corporation of Delaware No Drawing. Application February 20, 1943, Serial No. 476,643

4 Claims. (Cl. 260—617)

This invention relates to hydroxytetrahydronorpolycyclopentadienes, and this application is a continuation-in-part of copending applications Serial No. 442,188, filed May 8, 1942, and Serial No. 476,645, filed February 20, 1943.

When a polymer of cyclopentadiene containing two double bonds per molecule is hydrated by heating it with aqueous sulfuric acid between about 65° and 115° C., unsaturated secondary monohydric alcohols are obtained. These new alcohols are formed by the addition of water to one double bond of the polycyclopentadiene accompanied by a molecular rearrangement with the formation of a new ring system which has been termed the "norpolycyclopentadiene" ring system.

The reaction is applicable to dicyclopentadiene, tricyclopentadiene, tetracyclopentadiene, pentacyclopentadiene, homologues and isomers thereof, and the like, as individual hydrocarbons or as mixtures of such hydrocarbons, having the general formula:

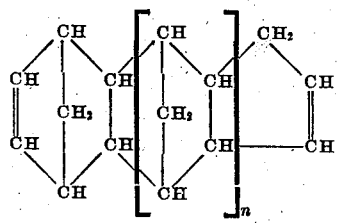

wherein n is zero or a small integer. The hydration-rearrangement occurs in the unsaturated cycle containing the endomethylene bridge.

For example, dicyclopentadiene upon hydration with aqueous sulfuric acid yields hydroxydihydronordicyclopentadiene having the probable Formula A or B:

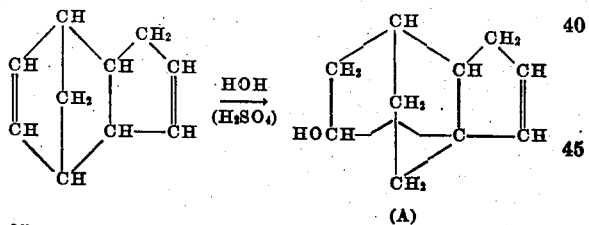

or

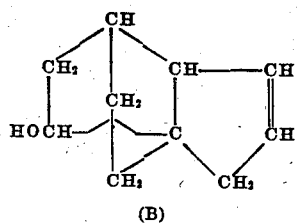

In a similar manner, tricyclopentadiene yields hydroxydihydronortricyclopentadiene having the probable Formula C or D:

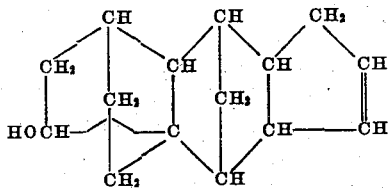

According to the present invention, hydroxydihydronorpolycyclopentadienes of the above type are reacted with hydrogen in the presence of active hydrogenation catalysts, such as finely divided nickel, platinum, platinum oxide or palladium, to form saturated alcohols, namely, hydroxytetrahydronorpolycyclopentadienes.

The hydrogenation takes place readily with Raney nickel catalyst at 85°–225° C. at superatmospheric pressure of hydrogen (100–2000 pounds per square inch). With platinum, platinum oxide or palladium catalysts, it takes place at 50° C. or even at room temperature, at hydrogen pressures ranging from atmospheric to about 100 pounds per square inch.

The hydroxytetrahydronorpolycyclopentadienes obtained according to this invention possess the probable formula:

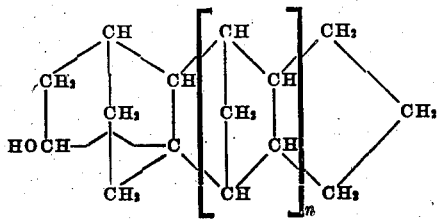

wherein n is zero or a small integer, such as 1, 2, or 3.

The following examples illustrate the invention, the parts being by weight:

Example 1

*Preparation of hydroxydihydronordicyclopentadiene.*—A mixture of 264 parts of dicyclopentadiene and 800 parts of aqueous 25% sulfuric acid is stirred rapidly and heated under a reflux condenser at 104°–107° C. for four and one-half hours. The aqueous sulfuric acid layer is then drawn off and the oil layer separated and washed successively with hot water, soda solution, and finally again with hot water. The oil is dried and distilled in vacuo. Hydroxydihydronordicyclopentadiene distils over between 105° and 115° C. at 6 mm. as a colorless viscid oil having a camphoraceous odor. The yield is 250 parts, or 83.4% of theory.

Upon redistillation, the pure compound boils at 102°–104°/7 mm. or at 239°–240° C. at 773 mm. It possesses the empirical formula $C_{10}H_{14}O$ and contains one double bond. Its refractive index, $N_D^{25}$ is 1.5246, and its density, $d_4^{25}$ is 1.0773. It does not solidify at 0° C.

*Hydrogenation of hydroxydihydronordicyclopentadiene.*—A mixture of 200 parts of hydroxydihydronordicyclopentadiene and 10 parts of Raney nickel catalyst is heated at 120°–125° C. in a shaking autoclave with hydrogen at 1500 pounds per square inch pressure until no more hydrogen is absorbed. This requires about two and one-half hours. The product is dissolved in alcohol, filtered free from nickel, and the filtrate distilled in vacuo.

The hydroxytetrahydronordicyclopentadiene distills at 120°–123°/13 mm. as a colorless viscous oil which crystallizes on cooling to a solid mass possessing a camphoraceous odor. It is extremely soluble in methanol, acetone, benzene, ether, or chloroform, but can be recrystallized from nitromethane, in which it is only slightly soluble. The pure compound separates in colorless crystals melting at 53° C. having the empirical formula $C_{10}H_{16}O$ and probable constitution:

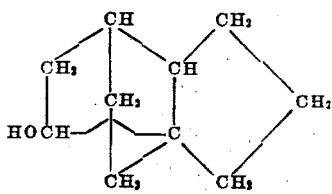

Its phenylurethane melts at 107°–108° C.

*Example 2*

*Preparation of hydroxydihydronortricyclopentadiene.*—A mixture of 198 parts of tricyclopentadiene (liquid, mixed alpha and beta isomers) and 333 parts of aqueous 30% sulfuric acid was stirred rapidly under reflux at 110° C. for five hours. The product was poured into boiling water and the oil layer separated by means of toluene from the aqueous layer. The toluene layer was washed several times with hot water, followed by a soda wash, and then again with water. The washed toluene layer was then distilled in vacuo. The fraction boiling at 145–170°/8 mm. was collected as crude hydroxydihydronortricyclopentadiene in a yield of 72 parts. Upon redistillation, it boiled at 180°–185°/11 mm. and solidified to a waxy crystalline mass. After recrystallization from nitroethane, the compound formed colorless needles having a melting point of 98°–99° and corresponding to the formula $C_{15}H_{20}O$.

*Hydrogenation of hydroxydihydronortricyclopentadiene.*—A mixture of 54 parts of hydroxydihydronortricyclopentadiene (melting point, 98°–99°), 100 parts of ethanol, and 5 parts of Raney nickel was shaken in an autoclave at 100° C. with hydrogen at 1700 pounds per square inch pressure for several hours until no more hydrogen was absorbed. The product was filtered and distilled in vacuo. The hydrogenated material distilled at 165°–175°/5 mm. and solidified to a colorless crystalline mass. After recrystallization from petroleum ether to constant melting point, it melted at 89°–90° and possessed the empirical formula $C_{15}H_{22}O$. Its p-nitrobenzoate melted at 150°–152°.

*Example 3*

A mixture of 99 parts of α-tricyclopentadiene (melting point, 61°–63°) and 167 parts of aqueous sulfuric acid was stirred rapidly at 110° C. under reflux for six hours. The product was washed thoroughly with hot water, followed by a wash with hot sodium carbonate solution, dried, and distilled in vacuo. The fraction boiling at 170°–175°/6 mm. amounted to 62 parts and solidified when rubbed with nitroethane. Upon recrystallization from nitroethane, it formed colorless needles having a melting point of 115° C., corresponding to hydroxydihydronortricyclopentadiene.

This was hydrogenated by heating its ethanolic solution with 2% by weight of Raney nickel catalyst at 190°–200° C. for four hours under a hydrogen pressure of 1500–2000 pounds per square inch until no more hydrogen was absorbed. After removal of the catalyst and the solvent, the residual crystalline hydroxytetrahydronortricyclopentadiene was obtained as colorless needles having a melting point of 99° C., after recrystallization from nitromethane.

In the same manner, tetracyclopentadiene yields hydroxydihydronortetracyclopentadiene, $C_{20}H_{25}OH$ boiling at 220°–240°/3 mm. Upon hydrogenation in ethanol with 5% by weight of Raney nickel catalyst at 170°–190° C., it yields hydroxytetrahydronortetracyclopentadiene as a colorless solid having the formula ($C_{20}H_{27}OH$) and the probable constitution:

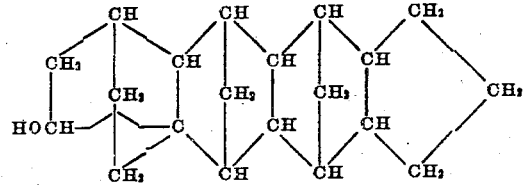

The above hydrogenated alcohols of the norpolycyclopentadiene ring system are useful in the form of their esters with monocarboxylic or polycarboxylic acids as plasticizers for synthetic rubber and other plastics. They can also be reacted with sulfonating agents to yield substances useful as wetting, emulsifying and cleansing agents.

Although in the above examples practically pure polycyclopentadienes have been used, the process shown may also be applied to mixtures of hydrocarbons which contain 5% or more of the polycyclopentadienes having two double bonds per molecule, such as are obtained in the thermal cracking of petroleum or in the manufacture of water gas. The reaction of the polycyclopentadienes provides a new means for separating the components of mixtures of unsaturated hydrocarbons and gives new utility to such products.

I claim:

1. As a new compound, a hydroxytetrahydronorpolycyclopentadiene, having the formula:

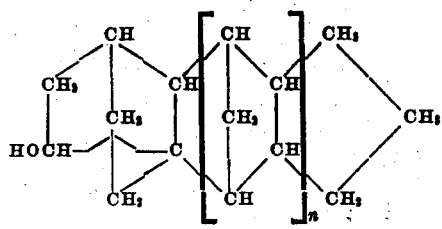

wherein $n$ is a number from 0 to a small integer.

2. As a new compound, hydroxytetrahydronordicyclopentadiene, melting when pure at 53° C., and having the formula:

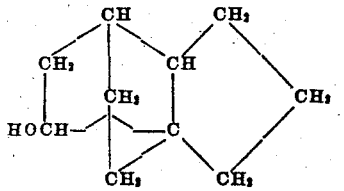

3. As a new compound, hydroxytetrahydronortricyclopentadiene having the formula:

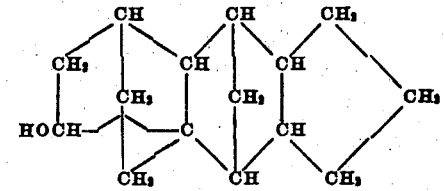

4. As a new compound, hydroxytetrahydronortetracyclopentadiene having the formula:

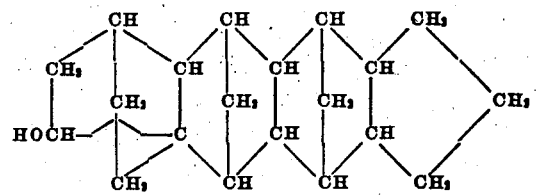

HERMAN A. BRUSON.